H. JANTSCH.
APPARATUS FOR THE PHOTOGRAPHIC REPRODUCTION OF BOOKS, WRITINGS, AND THE LIKE.
APPLICATION FILED MAR. 18, 1911.

1,085,866.

Patented Feb. 3, 1914.

2 SHEETS—SHEET 1.

Witnesses:

Inventor:
Heinrich Jantsch

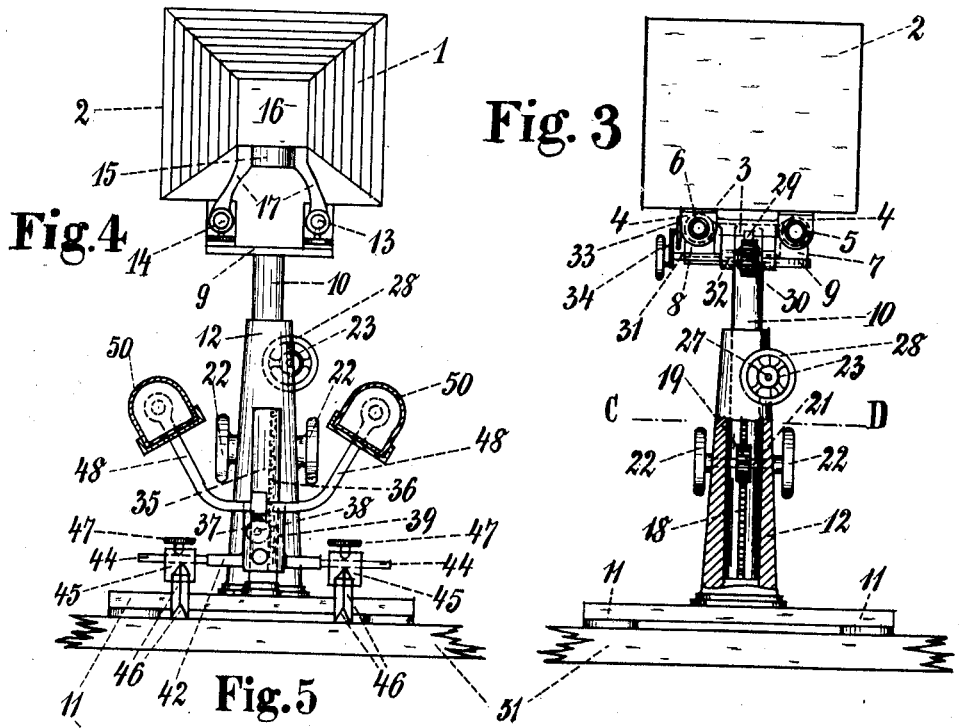
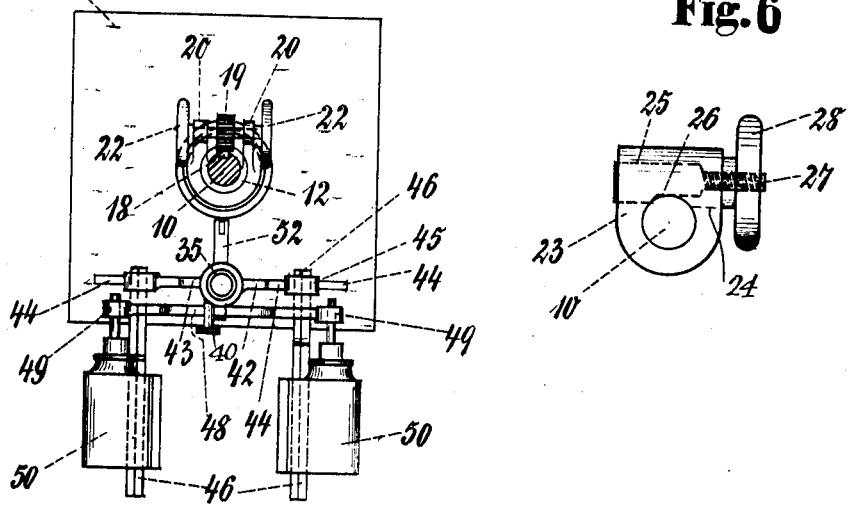

UNITED STATES PATENT OFFICE.

HEINRICH JANTSCH, OF LEIPZIG, GERMANY.

APPARATUS FOR THE PHOTOGRAPHIC REPRODUCTION OF BOOKS, WRITINGS, AND THE LIKE.

1,085,866.

Specification of Letters Patent. Patented Feb. 3, 1914.

Application filed March 18, 1911. Serial No. 615,405.

*To all whom it may concern:*

Be it known that I, HEINRICH JANTSCH, a subject of the German Emperor, and resident of Leipzig, Germany, have invented certain new and useful Improvements in Apparatus for the Photographic Reproduction of Books, Writings, and the like, of which the following is a specification.

In the known photographic cameras for the reproduction of writings, books, drawings, pictures or the like, in which the article to be reproduced is arranged on a table which is adjustable relatively to the objective of the camera, the camera must, for consecutive takings, for instance the pages of a book which are to be of the same proportion of size to each other as the original, be separately adjusted for the taking of each page with the aid of the opaque glass plate, owing to the different distance of each page from the objective. To avoid this, according to the present invention, two slides are provided which can be adjusted toward a base plate and which are guided parallelly to each other, and of which one carries the camera and the other stops which can be lowered on the article to be taken. On the latter slide, further a scale for adjusting the camera slide as well as an illumination device is arranged. Above the known art, thereby the advantage is obtained that for an equal proportion of reduction of all objects to be taken one adjustment only with the aid of the opaque glass plate is necessary. For the further takings, the stops must simply be lowered upon the object to be taken and the distance of the objective from the object must be kept constant for the desired degree of enlargement or reduction by means of the scale on the slide for the stops.

The accompanying drawing shows the improved apparatus.

Figure 1:
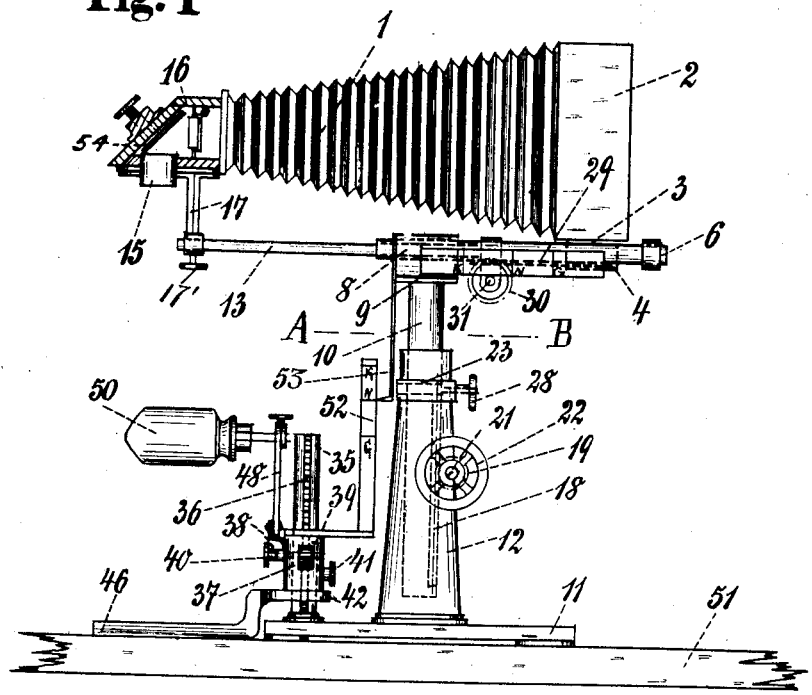
Figure 2:
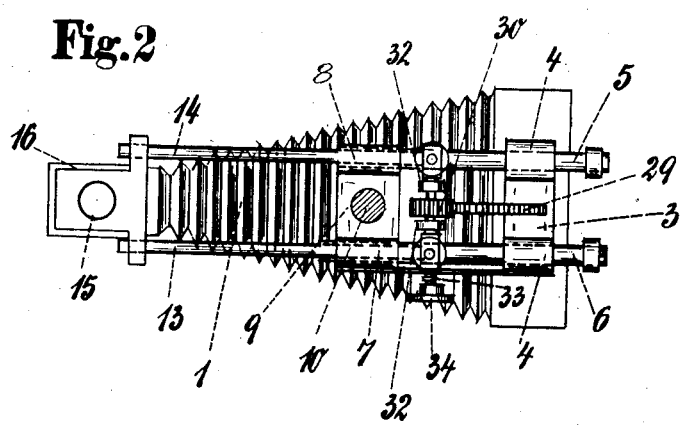

Figure 1 is a side view, Fig. 2 a sectional underside plan view, on the line A—B of Fig. 1, Fig. 3 a sectional rear view, Fig. 4 a sectional front view, and Fig. 5 a sectional plan view, on the line C—D of Fig. 3, of the same, while Fig. 6 shows a detail.

The front part 16 of the camera 1, which carries the objective 15 by means of an adjustable bracket 17, is connected with the casing 2 for the reception of films or plates by telescopic pipes 5, 6 and 13, 14 respectively which can be fixed to each other, the casing being for this purpose provided with a depending bracket 3, by which it is mounted through the medium of lugs 4 on the outer pipes 5, 6. The latter are fixed in lugs 7, 8 of a plate 9, which is carried by a rod 10 slidably mounted in a hollow stand 12. On the bracket 3, a rack 29 is disposed, which projects toward the stand 12. With said rack gears a toothed wheel 30, which is fixed on the axle 31. Said axle is located in lugs 32 of the outer pipes 5, 6 and can be turned by means of a hand wheel 34 in such a way that by the gearing 29, 30 the rear part 2 of the camera is moved toward the front part 16 carrying the objective, or vice versa, whereby the bellows of the camera is contracted or expanded. In order to regulate the extent of the movement of said bellows according to the size of the pictures to be taken, a pointer 33 is arranged on the rack 29, which can be adjusted along a scale fixed on the lugs 7 and 4 and provided with three division-marks K, N, G. The bracket 17 carrying the part 16 can be shifted and fixed, by means of set-screws 17', on the inner pipes 13, 14 according to the position of the object to be taken. The rod 10 carries a longitudinal toothed rack 18, which gears with a toothed wheel 19. The latter is revolubly mounted in projections 20 of the stand 12 and projects through a slot in the latter into the hollow space of same. On both ends of the axle 21 of the toothed wheel a hand wheel 22 is placed, by which the toothed wheel 19 can be turned in such a way that the rod 10 together with the camera 1 can be moved up or down in the hollow stand. Somewhat above said gearing 18, 19 the outside of the stand carries a projection 23 in the boring 24 of which a bolt 25 is inserted, which possesses on its side facing the rod 10 a tapered projection 26 and which carries further a screw-threaded portion 27 on which a nut 28 is screwed. By correspondingly turning said nut, the bolt 25 is tightened so that the thicker part of same clamps the rod 10 in such a way that the same is fixed in any desired position, the disengagement of the rod being effected by loosening the nut. On the foot-plate 11 of the hollow stand a column 35 is located parallel to the latter, on which a slide 39 is movably mounted, a toothed wheel 37 being located in the latter, which projects through a slot and gears with a toothed rack 36 extending over the whole length of the column 35.

By turning the toothed wheel 37 from a hand wheel 40 on the axle 38 of the toothed wheel the slide 39 can be moved up or down. By means of a set-screw 41, the latter can be fixed in any position. At the lower end the slide 19 carries on laterally projecting arms 42, 43 two stops 46, which are mounted with their eye-ends 45 on the thinner parts 44 of said arms and adapted to be lowered upon the object to be taken. The stops can be approached to or removed from each other along the arms 42, 43 and fixed thereon in any position by means of a clamp screw 47.

At the upper end of the slide 39 a curved strap 48 is located, which carries on each of its eye-ends 49 a light reflector 50, by which the light issuing from any, for instance electrical source is uniformly distributed onto the object to be taken.

As the stops 46 as well as the strap 48 carrying the illumination device are arranged on a common slide 39, both parts are always kept at the same distance from each other. On the sleeve 39, further a vertical arm 52 is arranged which carries a scale with division marks, along which a pointer 53 fixed on the slidable rod 10 can be adjusted when moving the slide 39 or the slidable rod 10.

The manipulation and operation of the apparatus is as follows:—The book or the like, from which a picture is to be taken, is put on the table 51 on which also the apparatus is placed. First, the slide 39 is so adjusted that the stops 46 rest upon the page first to be taken. Then, the slide 10 of the camera is so adjusted that the pointer 53 is directed toward a certain division-mark on the arm 52. The division-marks of the scale on the arm 52 correspond to different adjustments of the camera. After the picture is sharply adjusted on the opaque glass plate, the film or plate is inserted and the picture is taken by the objective, all this being effected through the medium of a mirror 54 behind the objective. A renewed adjustment with the aid of the opaque glass plate is not required for the following takings to be made of the same proportion of size. When taking the following pages of the book, the catchers 25 are adjusted by means of the slide 39 corresponding to the distance of these pages from the table 51. The distance of the light reflectors and of the scale from the object to be taken remains thereby the same, so that only the position of height of the camera must be so altered that the pointer 53 is again directed toward the same division-mark as before, in order to obtain a reduction or enlargement of the same size as before. By the improved apparatus, thus the space between the surface of the object to be taken and the objective can for consecutive takings be quickly adjusted to the same distance, simply by comparing pointer and scale, so that in one hour takings of about 200 pages can be produced.

I claim—

In an apparatus for the photographic reproduction of writings, books or the like, the combination of a table for the reception of the object to be taken, two parallelly guided slides adapted to be separately adjusted relatively to the table, a camera and a pointer on one slide, stops on the other slide adapted to be lowered upon the object to be taken, and a scale on the latter slide to coöperate with the pointer, substantially as and for the purpose set forth.

In testimony whereof I have hereunto set my hand in the presence of two subscribing witnesses.

HEINRICH JANTSCH.

Witnesses:
 RUDOLPH FRICKE,
 ALBERT R. MORAWETZ.